(12) United States Patent
Elkis et al.

(10) Patent No.: US 7,175,578 B2
(45) Date of Patent: Feb. 13, 2007

(54) ROTARY DIE CUTTER WITH RECTILINEAR SPLIT DIE CYLINDER TRANSLATION

(75) Inventors: Michael Elkis, Columbia, MD (US); Leonard T. Katilas, Baltimore, MD (US)

(73) Assignee: MarquipWardUnited, Inc., Hunt Valley, MD (US)

( * ) Notice: Subject to any disclaimer, the term of this patent is extended or adjusted under 35 U.S.C. 154(b) by 62 days.

(21) Appl. No.: 10/714,316

(22) Filed: Nov. 14, 2003

(65) Prior Publication Data

US 2005/0103173 A1    May 19, 2005

(51) Int. Cl.
  *B23Q 3/155* (2006.01)
  *B23Q 3/157* (2006.01)
(52) U.S. Cl. .................... 483/16; 83/346; 493/475
(58) Field of Classification Search ............... 483/16; 83/343–346, 481–482, 551, 559–560, 563, 83/954; 409/159–160, 167, 172, 177, 202, 409/234–235; 72/238–239; 493/468, 475, 493/478–479
See application file for complete search history.

(56) References Cited

U.S. PATENT DOCUMENTS

| 3,257,882 A | 6/1966 | Lulie et al. |
| 3,489,043 A | 1/1970 | Dent |
| 3,587,374 A | 6/1971 | Stewart |
| 3,599,518 A | 8/1971 | Goettsch |
| 3,621,527 A | 11/1971 | Michalak |
| 4,142,455 A | 3/1979 | Coburn |
| 4,188,815 A * | 2/1980 | Mizushima ............... 483/29 |
| 4,251,180 A * | 2/1981 | Hansen .................... 414/560 |
| 4,252,044 A * | 2/1981 | Yamashita et al. ......... 83/499 |
| 4,413,541 A * | 11/1983 | Biggar, III ............... 83/346 |
| 4,583,437 A | 4/1986 | Rader et al. |
| 4,685,390 A * | 8/1987 | Pav et al. ................ 100/168 |
| 4,976,676 A * | 12/1990 | Mensing et al. .......... 493/365 |
| 5,001,950 A * | 3/1991 | Fokos et al. ............... 83/37 |
| 5,107,695 A | 4/1992 | Vandenbroucke |
| 5,120,297 A | 6/1992 | Adami |
| 5,131,900 A | 7/1992 | Schroeder |
| 5,388,490 A * | 2/1995 | Buck ...................... 83/880 |
| 5,582,569 A | 12/1996 | Kowalewski et al. |
| 5,778,782 A | 7/1998 | Behringer et al. |

(Continued)

FOREIGN PATENT DOCUMENTS

EP        0 236 499        9/1987

(Continued)

*Primary Examiner*—Monica Carter
*Assistant Examiner*—Eric A. Gates
(74) *Attorney, Agent, or Firm*—Andrus, Sceales, Starke & Sawall, LLP

(57) ABSTRACT

A rotary die cutter having an anvil cylinder that is operable alternately with one of a pair of die cylinders includes a vertical support and rectilinear translation arrangement that permits selective repositioning of each of the die cylinders between an operative position and a stand-by position utilizing various combinations of horizontal and vertical linear movement of the cylinders. In the presently preferred embodiment, the supporting frames of all three cylinders, in operation, are in abutting contact and vertically aligned to assure that shock loads are directed vertically downwardly into the supporting base. The operator has direct access to each of the die cylinders for maintenance and order change from a single station positioned below the board line.

16 Claims, 13 Drawing Sheets

U.S. PATENT DOCUMENTS

| | | |
|---|---|---|
| 5,802,945 A | 9/1998 | Brinkmeier et al. |
| 5,827,159 A | 10/1998 | Adachi |
| 5,842,399 A | 12/1998 | Pfaff, Jr. |
| 6,012,365 A | 1/2000 | Dufour et al. |
| 6,086,694 A * | 7/2000 | Winter et al. ............ 156/64 |
| 6,138,544 A | 10/2000 | Newell |
| 6,253,593 B1 * | 7/2001 | Goto et al. ............ 72/239 |
| 6,408,667 B1 * | 6/2002 | de Jesus, Jr. ............ 72/238 |
| 6,425,278 B1 * | 7/2002 | Aratani et al. ............ 72/239 |
| 2002/0174753 A1 | 11/2002 | Cox |

FOREIGN PATENT DOCUMENTS

| | | |
|---|---|---|
| EP | 0 407 354 A2 | 1/1991 |
| EP | 0 407 354 A3 | 1/1991 |
| EP | 0 776 741 A1 | 6/1997 |
| EP | 0 999 019 | 5/2000 |
| GB | 2 046 664 | 11/1980 |

* cited by examiner

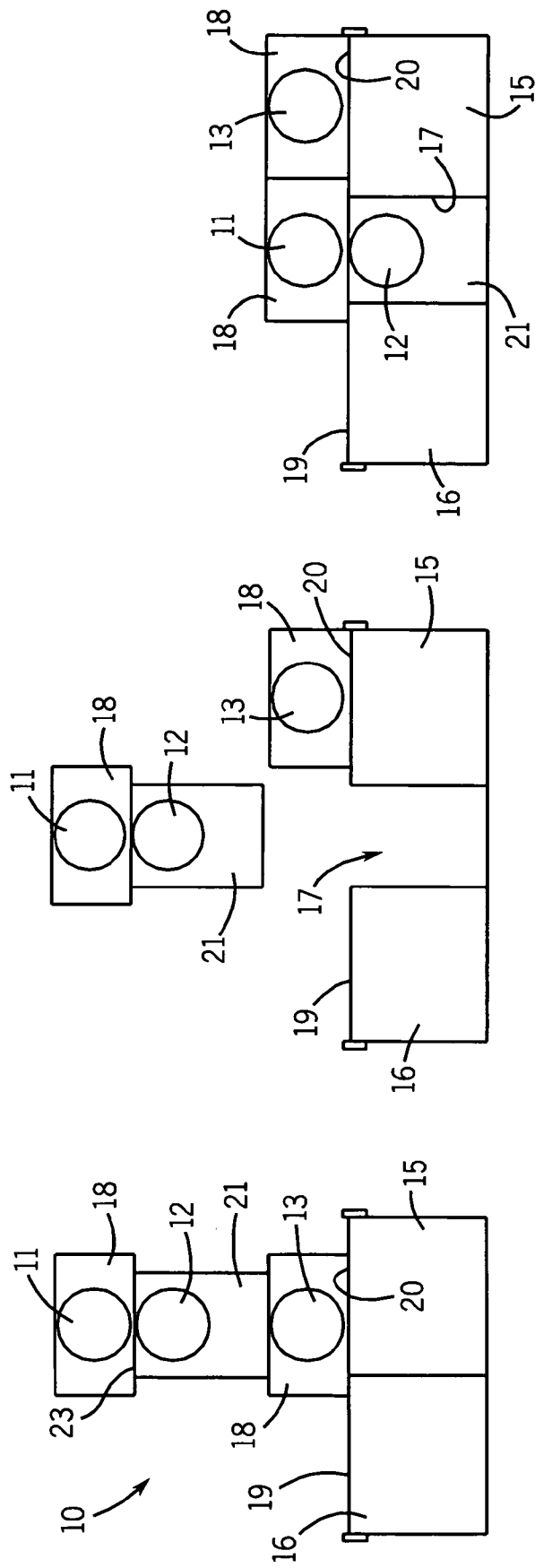

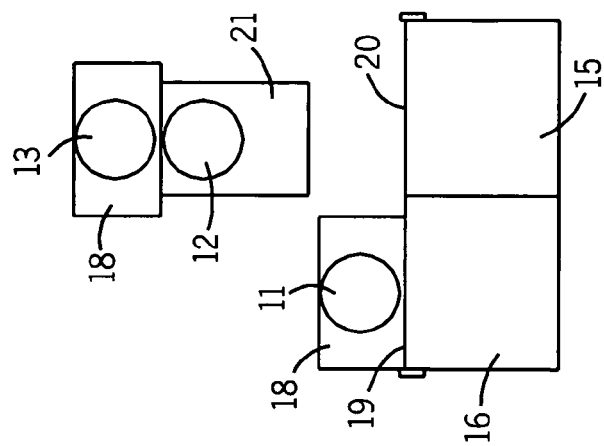
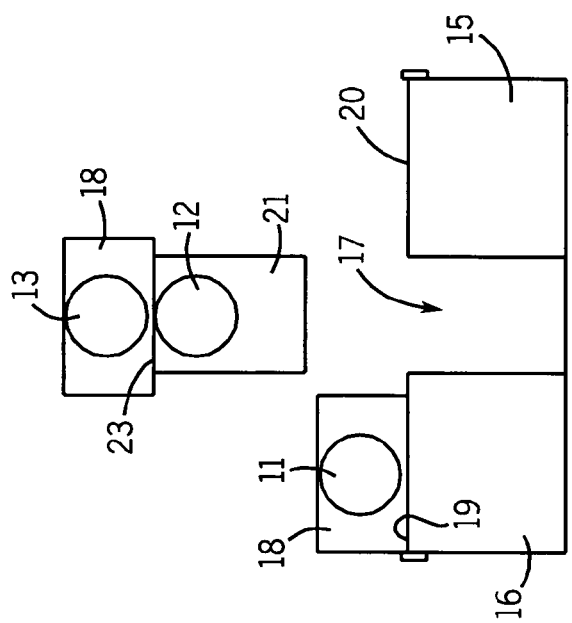
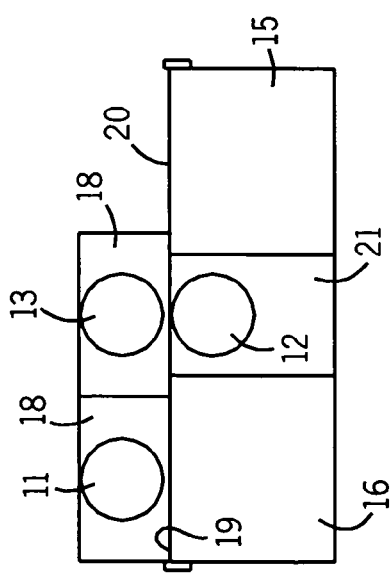

ROTARY DIE CUTTER WITH RECTILINEAR SPLIT DIE CYLINDER TRANSLATION

BACKGROUND OF THE INVENTION

The present invention relates to a rotary die cutter for converting sheets of paperboard or other web materials and, more particularly, to a rotary die cutter having an anvil cylinder and a pair of alternately operable die cylinders mounted for vertical support and rectilinear translation.

Rotary die cutters are well known in the art and, in one common application, are used to cut, slot, or notch paperboard sheets to provide blanks for cartons. In one common application, corrugated paperboard blanks, which may have been previously printed, are processed through a rotary die cutter to provide slots which define the flaps for cartons made from the paperboard blanks, for example, in a downstream folder-gluer.

The increasing capability of this machinery for accuracy and high speed production has resulted in a similar need for high speed die cylinder change at order change without sacrificing accuracy. It has also been found that, with the typical structural connection between the die cutter and the upstream print rolls, vibration and shock loads developed at the die cutter were transmitted to the printing equipment. In particular, low frequency, high amplitude shock loads, such as may be generated by loosened plywood backing for the cutting die on the die cylinder, result in the transmission of extremely high and potentially damaging shock loads to the print stations.

SUMMARY OF THE INVENTION

In accordance with the present invention, a rotary die cutter having an anvil cylinder and a pair of die cylinders that are alternately operable with the anvil cylinder includes a vertical support and rectilinear translation arrangement for repositioning each of the die cylinders between an operative position and a stand-by position. The arrangement includes a supporting base upon which either one of the die cylinders or the anvil cylinder is supported at its opposite ends for horizontal linear movement relative to the other of said die cylinders or anvil cylinder, and the other of the anvil cylinder or die cylinder is supported at opposite ends for vertical movement between an operative position and a stand-by position. In the operative position, the anvil cylinder and at least one die cylinder are vertically aligned and supported on the supporting base.

In a presently preferred embodiment, each die cylinder is supported for independent horizontal linear movement on the supporting base in its stand-by position, the anvil cylinder is supported for vertical linear movement with the operative die cylinder between an upper operating position and a lower die cylinder exchange position, and both of the die cylinders are supported for unidirectional horizontal linear movement on the supporting base in the die cylinder exchange position. In one variation of the preferred embodiment, the supporting base includes laterally spaced upstream base portions and downstream base portions which define therebetween an opening in the supporting base; the apparatus further comprises die cylinder end supports which rotatably support each die cylinder at opposite axial ends on the base portions, the die cylinder end supports sized and positioned to span the opening in the base in the stand-by position, anvil cylinder end supports that rotatably support the anvil cylinder at opposite axial ends on a vertical translation mechanism, the anvil cylinder end supports sized to move into the opening in the base in response to downward movement on said translation mechanism to carry the operative die cylinder therewith to the lower die cylinder exchange position.

In a presently preferred variation, the supporting base includes a pair of laterally spaced upstream base portions and a pair of laterally spaced downstream base portions, similar to the previously described variation. However, one of the pairs of base portions is movable between a closed position adjacent the other pair of base portions in the operative position and an open position spaced from the other pair of base portions to define an opening therebetween in the cylinder exchange position. The anvil cylinder has end supports to rotatably support the anvil cylinder at opposite axial ends on a vertical translation mechanism, the anvil cylinder end supports being sized to move into the opening in the base in response to downward movement on the translation mechanism to carry the operative die cylinder with it to the lower die cylinder exchange position. Each die cylinder is supported by die cylinder end supports at opposite axial ends to support the die cylinder on one of the base portion pairs in the stand-by and exchange positions and on the anvil cylinder end supports in the operative and exchange positions. In the operative position of this presently preferred embodiment, the vertical support arrangement comprises, in serial vertical order, the movable base portions, the die cylinder in the stand-by position, the anvil cylinder, and the die cylinder in the operative position.

The base portions preferably comprise a pair of fixed base portions which have upper horizontal edges defining first die cylinder tracks, a pair of translatable base portions which have upper horizontal edges defining second die cylinder tracks and lower horizontal edges defining base portion carriages, and a pair of base tracks that support the base portion carriages for moving the translatable base portions between the closed and opened positions. The end supports for each die cylinder include lower horizontal edges that define die cylinder carriages for moving the die cylinder on the first and second die cylinder tracks, and upper horizontal edges that support the anvil cylinder end supports in the operative position.

In an alternate embodiment of the invention, the anvil cylinder is mounted for horizontal linear movement on the supporting base and each of the die cylinders is alternately movable vertically between the operative and stand-by positions in response to horizontal reciprocal movement of the anvil cylinder. In the operative position, the anvil cylinder and one die cylinder are vertically aligned.

In one alternate embodiment, an outfeed conveyor and infeed conveyor are mounted on the supporting base downstream and upstream respectively on the anvil cylinder, and the infeed conveyor is adapted to move horizontally with the anvil cylinder between an active downstream sheet infeed position and an inactive upstream position. The outfeed conveyor is adapted to move horizontally with the anvil cylinder to provide an active sheet outfeed position in both the downstream and upstream positions of the anvil cylinder.

In a further variation, the die cylinders are horizontally spaced from one another to provide an upstream die cylinder and a downstream die cylinder, each die cylinder is mounted for reciprocal vertical movement between a stand-by position below the anvil cylinder and an operative position above the anvil cylinder. In this embodiment, an infeed conveyor is mounted above the upstream die cylinder for vertical movement therewith between an active position with the upstream die cylinder in the stand-by position and an inactive position with the upstream die cylinder in the operative position. This apparatus may also include an auxiliary outfeed conveyor mounted above the downstream die cylinder for vertical movement therewith between an active position with the downstream die cylinder in the stand-by position and an inactive position with the downstream die cylinder in the operative position. Similarly, an auxiliary infeed conveyor mounted above the upstream die cylinder moves therewith between an active position with the upstream die cylinder in the stand-by position and in inactive position with the upstream die cylinder in the operative position.

BRIEF DESCRIPTION OF THE DRAWINGS

FIGS. 1–6 are schematic end views of the die cylinders and the anvil cylinder showing the linear translation of the cylinders to exchange die cylinders between the operative and stand-by positions.

DETAILED DESCRIPTION OF THE PREFERRED EMBODIMENTS

Figure 7:
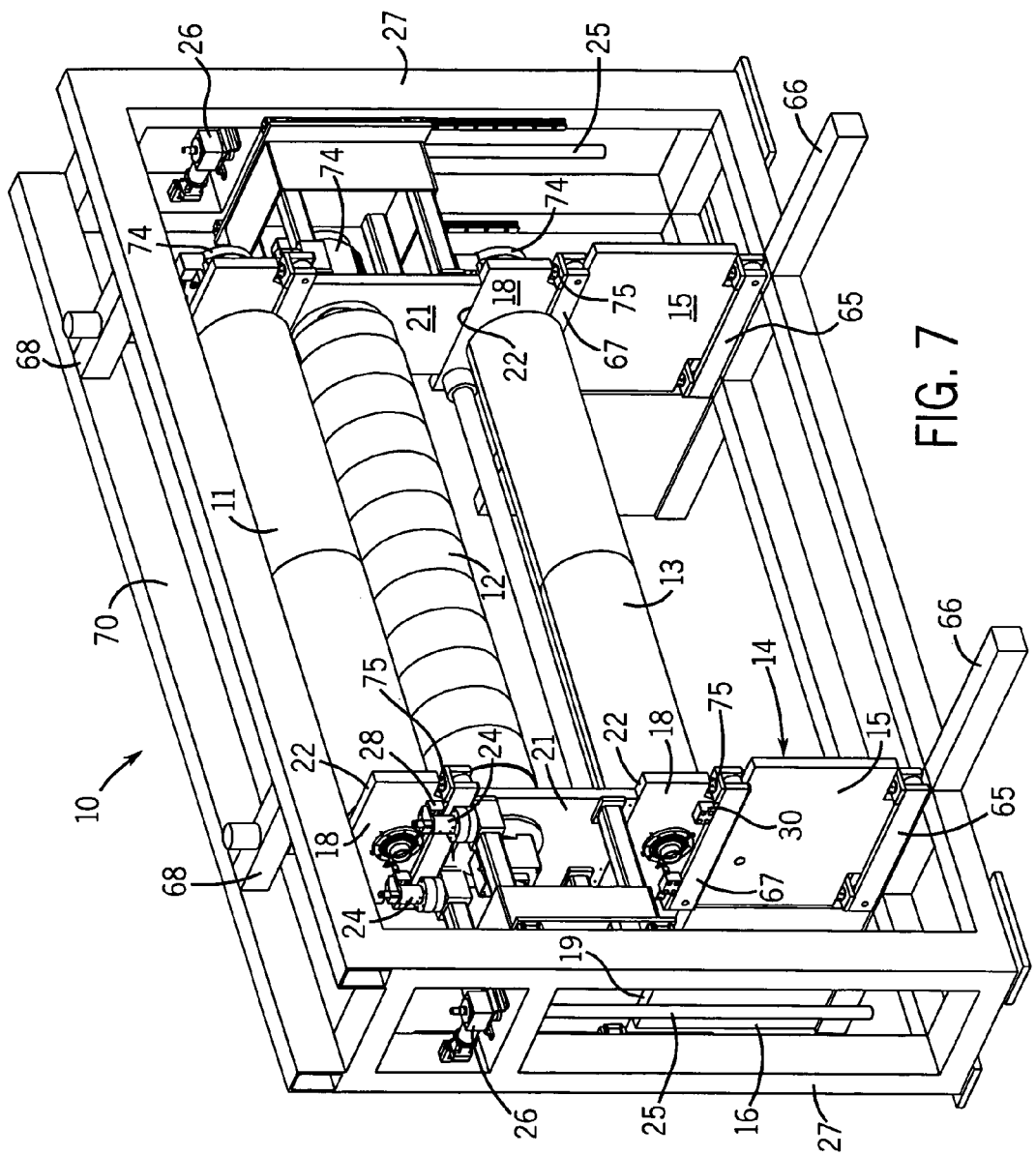
FIGS. 7–12 are perspective views of the apparatus of the present invention corresponding, respectively, to FIGS. 1–6.

Referring initially to FIGS. 1 and 7, a rotary die cutter 10 of the presently preferred embodiment of the invention includes an upper first rotary die cylinder 11 in operative engagement with a counterrotating anvil cylinder 12. A second rotary die cylinder 13 is positioned in a stand-by position vertically below the anvil cylinder 12 and first die cylinder 11. In its stand-by position, the second die cylinder 13 is accessible by an operator A (see FIG. 13) to change the die cutting tools for a subsequent order. In the meantime, the running order passes overhead, above the operator A, through the operating nip of the first die cylinder 11 and anvil cylinder 12.

When the running order is completed, the second die cylinder 13 is moved from its stand-by position below the anvil cylinder 12 into the operating position of the first die cylinder 11, while the latter is moved to the stand-by position of the second die cylinder 13. This exchange of die cylinder positions is accomplished by operation of the rectilinear translation arrangement of the present invention. In the running position shown in FIGS. 1 and 7, all three cylinders 11–13 are supported from below on a supporting base 14 comprising a pair of laterally spaced upstream base portions 15 which are also translatable linearly in the upstream direction, as will be described. A pair of laterally spaced fixed position downstream base portions 16 also forms part of the supporting base during the die cylinder exchange. Thus, the upstream base portions 15 are movable horizontally between a closed position adjacent the downstream base portions 16 and an open position spaced from the downstream base portions 16 to define an opening 17 therebetween in the supporting base. Each of the die cylinders 11 and 13 is rotatably supported at its axial ends on rectangular plate-like end supports 18. The end supports 18 are positioned in lateral alignment (in the cross machine direction) with the supporting base portions 15 and are mounted to move horizontally over the upper edges of the fixed base portions 16 which form die cylinder tracks 19. In a similar manner, the upper edges of the movable upstream base portions 15 form die cylinder tracks 20 over which the die cylinder end supports 18 travel. In addition and as will be described in greater detail, the die cylinder end supports 18 of one of the die cylinders travel with the movable upstream base portions 15 as the positions of the upper and lower die cylinders 11 and 13 are changed. The bottom edges of the horizontally translatable upstream base portions 15 are provided with base portion carriages which carry the base portions over a pair of base tracks 66. The lower horizontal edges of each of the die cylinder end supports 18 are similarly provided with die cylinder carriages 67 for travel over the die cylinder tracks 19 on the fixed downstream base portions 16 and the die cylinder tracks 20 on the movable upstream base portions 15. The lengths of the die cylinder end supports 18 in the machine direction are approximately equal to the lengths of the base portions 15 and 16. The opening 17 between the fixed downstream base portions 16 and the movable upstream base portions 15, when the latter are moved to their upstream positions, is approximately equal to the lengths of the anvil cylinder 12 end support 21.

The anvil cylinder 12 is rotatably mounted on a pair of end supports 21 which are aligned with and positioned between the end supports 18 of the first and second die cylinders 11 and 13 in the FIG. 7 position. In this operative position, the upper horizontal edges 22 of the lower die cylinder end supports 18 provide direct bearing support for the anvil cylinder end supports 21.

In the running position of the apparatus shown schematically in FIG. 1 and in the perspective view of FIG. 7, the end supports 18 of the lower die cylinder 13 are supported on the upstream base portions 15. The end supports 21 of the anvil cylinder rest upon the upper support edges 22 of the lower die cylinder 13 and the end supports 18 of the upper (operating) die cylinder 11 rest upon and are supported by the upper support edges 23 of the anvil cylinder end supports 21. Thus, the load of the entire apparatus is carried by the base portions 15 and transmitted directly into the foundation on which the die cutter 10 is supported. By separating the supporting base 14 from any associated upstream equipment, such as print rolls, any accidental shock loads applied to the die cutter 10 will be transmitted directly downwardly into the foundation and not to the associated upstream (or downstream) equipment. Each of the base portion carriages 65 and die cylinder carriages 67 include upstream and downstream rollers which are spring biased to engage the respective tracks 66 and 20 in the operative position. An overhead clamping device 68 on the upper frame member 70 applies a downward clamping force to the upper edges 22 of the upper die cylinder end supports 18 to clamp the entire assembly. The clamping force overcomes the bias of the spring-mounted carriage rollers to provide the direct bearing support between the upper die cylinder end supports 18 and the anvil cylinder end supports 21 and between the lower die cylinder end supports 18 and the upstream base portions 15.

Also, the upper die cylinder end supports 18 are locked to the anvil cylinder end supports 21, as will be described below.

Each of the die cylinders 11 and 13 and the anvil cylinder 12 is directly driven by its own drive motor 74 mounted to one of the respective end supports 18 and 21, respectively. Such an arrangement is shown, for example, in U.S. Pat. No. 5,582,569 which is incorporated by reference herein. Separate direct drive motors 74 for each of the cylinders facilitates the linear translation of the cylinders to exchange the die cylinders as will be described in detail below.

Figure 8:
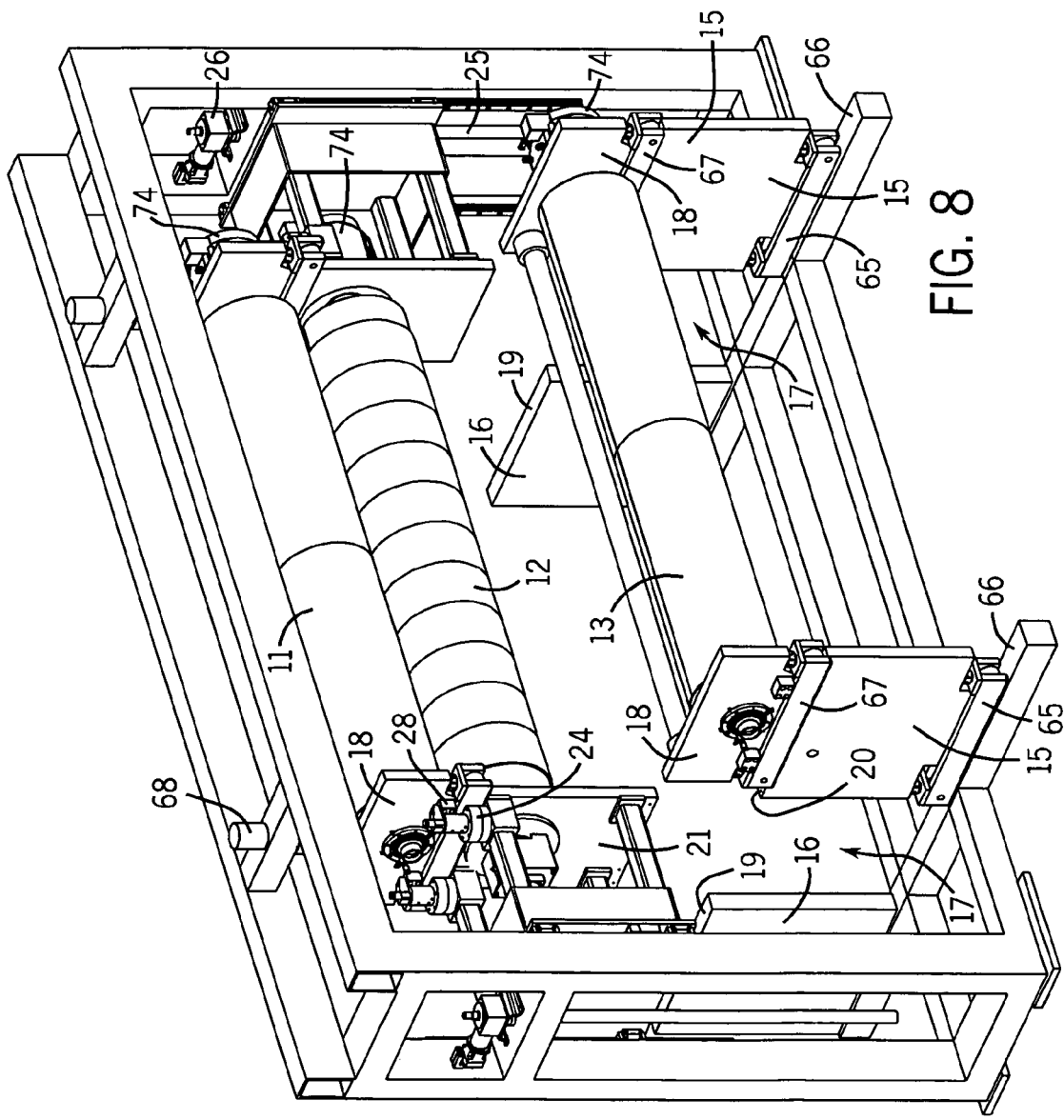

When a running order of sheets has been completed, the overhead clamping device 68 unclamps the entire assembly, and the anvil cylinder 12 with upper die cylinder 11 are then moved together vertically upwardly by a small amount. The lower die cylinder 13 which has been set up by the operator A for the new order, is translated horizontally to the right by moving the base portions 15 in the upstream direction carrying the die cylinder 13 therewith, as shown in FIGS. 2 and 8. In other words, the lower die cylinder 13 is moved horizontally to the right on the upstream base portions 15. Horizontal translation of the die cylinder 13 and the upstream base portions 15 may be accomplished by any suitable means, such as a lead screw or a rack and pinion apparatus (neither of which is shown). Also, as soon as the running order is completed, the anvil 12 is moved vertically away from the die cylinder 11 by a small amount. Such movement may be provided by journaling the drive motor 74 and the anvil cylinder in an eccentric bearing housing in the end support 21, all in a manner well known in the art.

Figure 9:
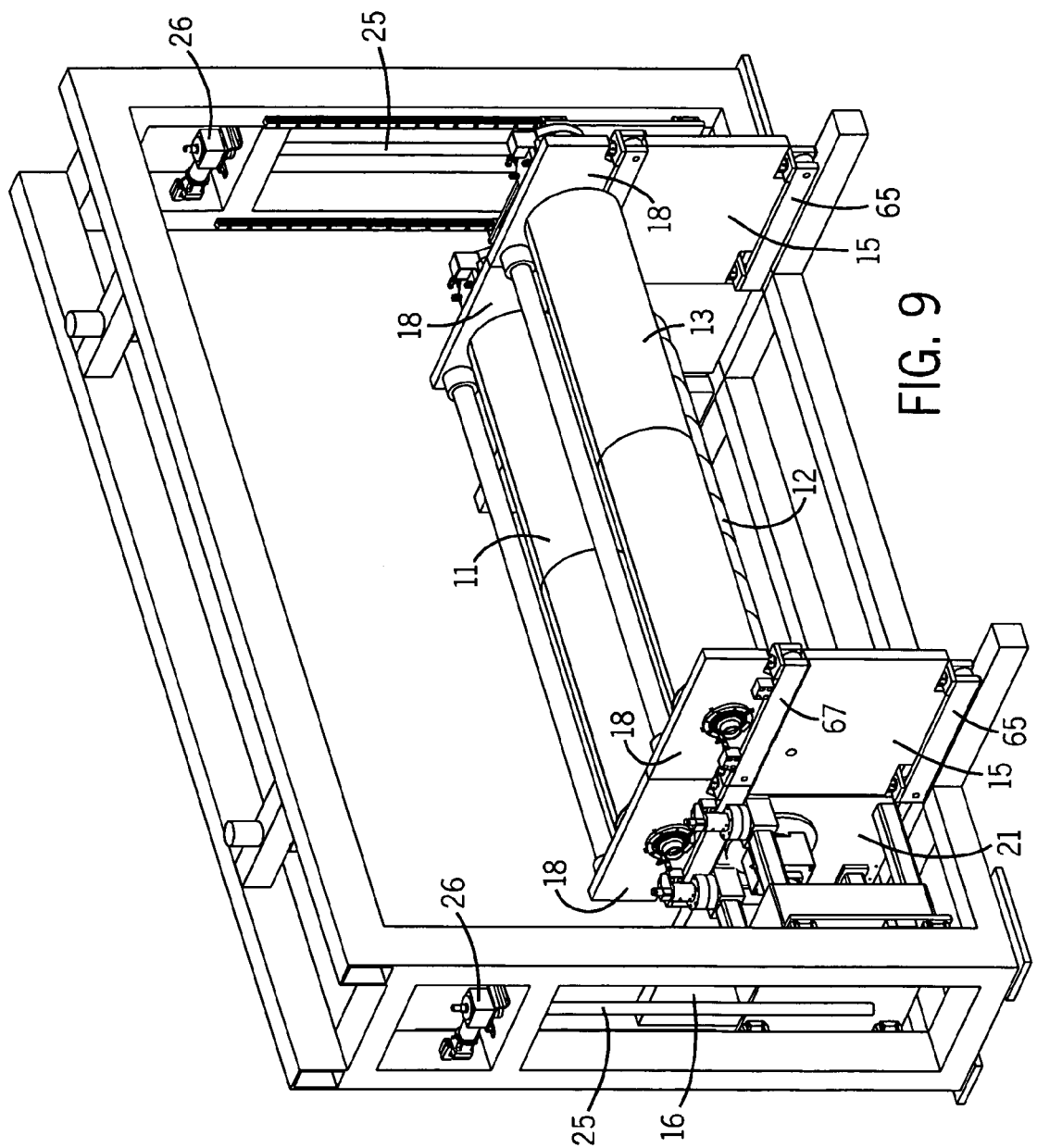

Referring now to FIGS. 3 and 9, the anvil cylinder 12 and the upper die cylinder 11 are then moved together vertically downwardly, allowing the anvil cylinder end supports 21 to move through the opening 17 between the respective pairs of base portions 15 and 16 until the end supports 21 for the anvil cylinder 12 come to rest on a lower frame member 71. Vertical movement of the anvil cylinder 12 is provided by a pair of vertical lead screws 25 driven by synchronized motor/reducers 26 mounted at the top of laterally spaced side frame members 27. In their operative positions and during the vertical movement of the anvil cylinder 12 and upper die cylinder 11, from the FIG. 2 position to the FIG. 3 position, the end supports 18 of the upper die cylinder 11 are locked to the end supports 21 of the anvil cylinder 12 with locking devices 24 at the top of the anvil cylinder end supports 21 cooperating with target blocks 28 at the bottom of the die cylinder end supports 18. Lower die cylinder 13 is provided with identical target blocks 30. The foregoing two step movement, first, of the base portions 15 and the lower die cylinder 13 horizontally out from under the anvil cylinder and upper die cylinder, and second, of the anvil cylinder 12 and upper die cylinder 11 vertically downwardly is shown in FIGS. 8 and 9.

Figure 10:
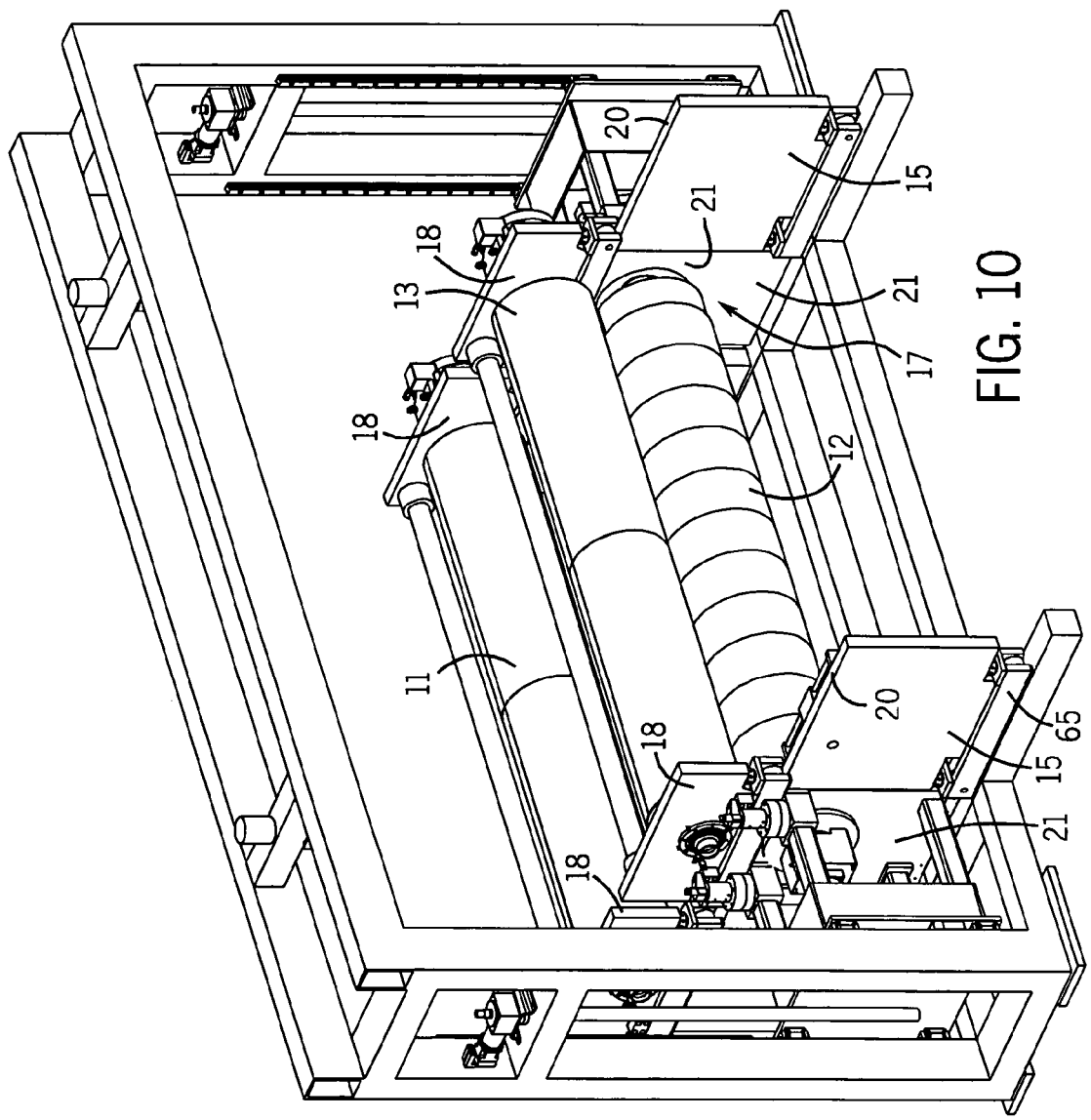

Continuing with reference to FIGS. 4 and 10, the locking devices 24 locking the first die cylinder 11 to the anvil cylinder 12 are released and springs 75 in the carriages 67 push the die cylinder end supports 18 upward, fully supporting the die cylinder unit by the rolling carriages 67 and providing a small clearance between the bottom of the end supports 21 and the tracks 19 and 20. Both die cylinders 11 and 13 are then moved over the die cylinder tracks 19 and 20 in the downstream direction to move the first die cylinder 11 out of vertical alignment with the anvil cylinder 12 and to move the second die cylinder 13 into vertical alignment over the anvil cylinder 12 to occupy the position vacated by horizontal movement of the first die cylinder 11. The movable base portions 15 remain in their upstream position.

Figure 11:
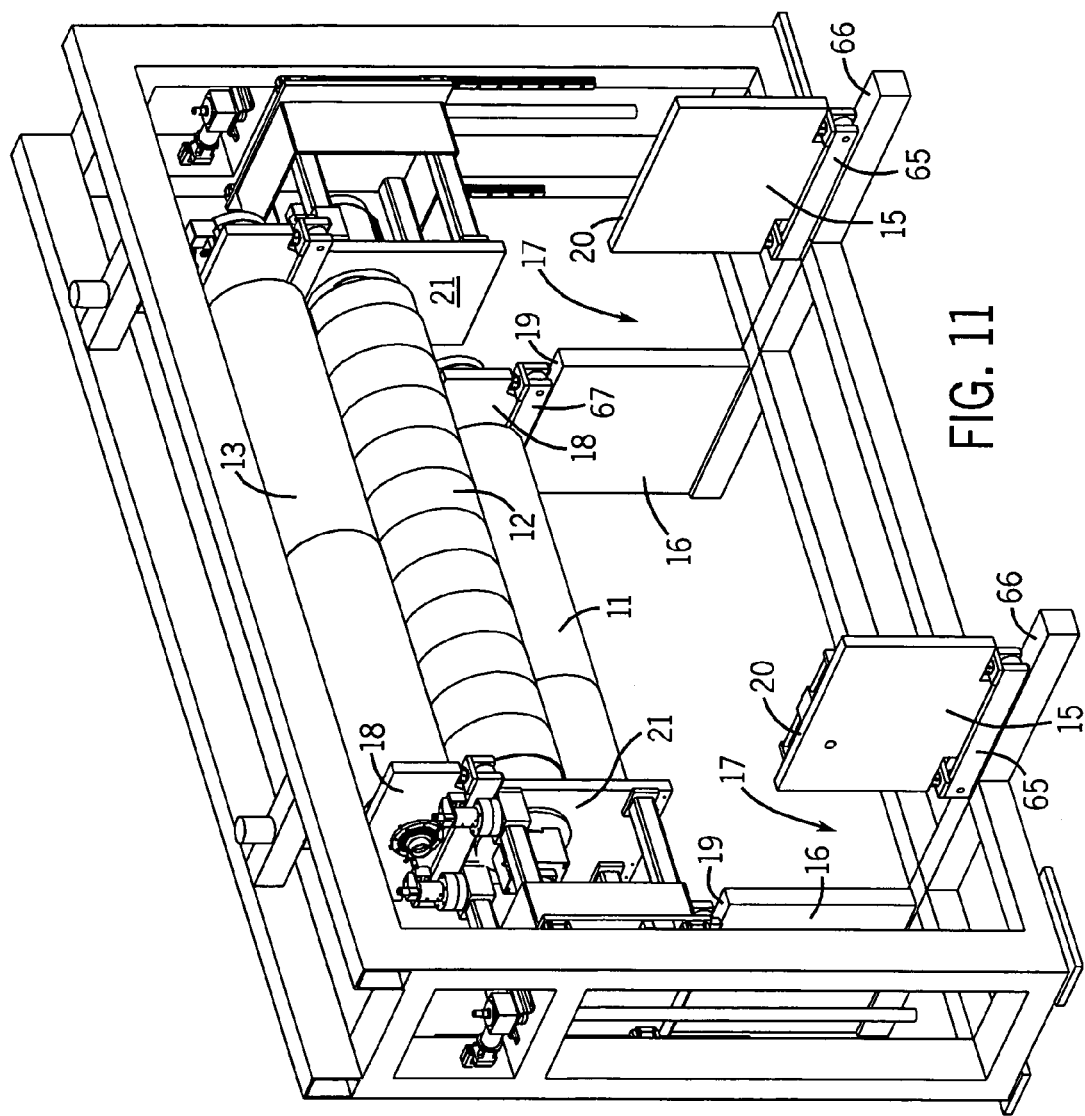
Figure 12:
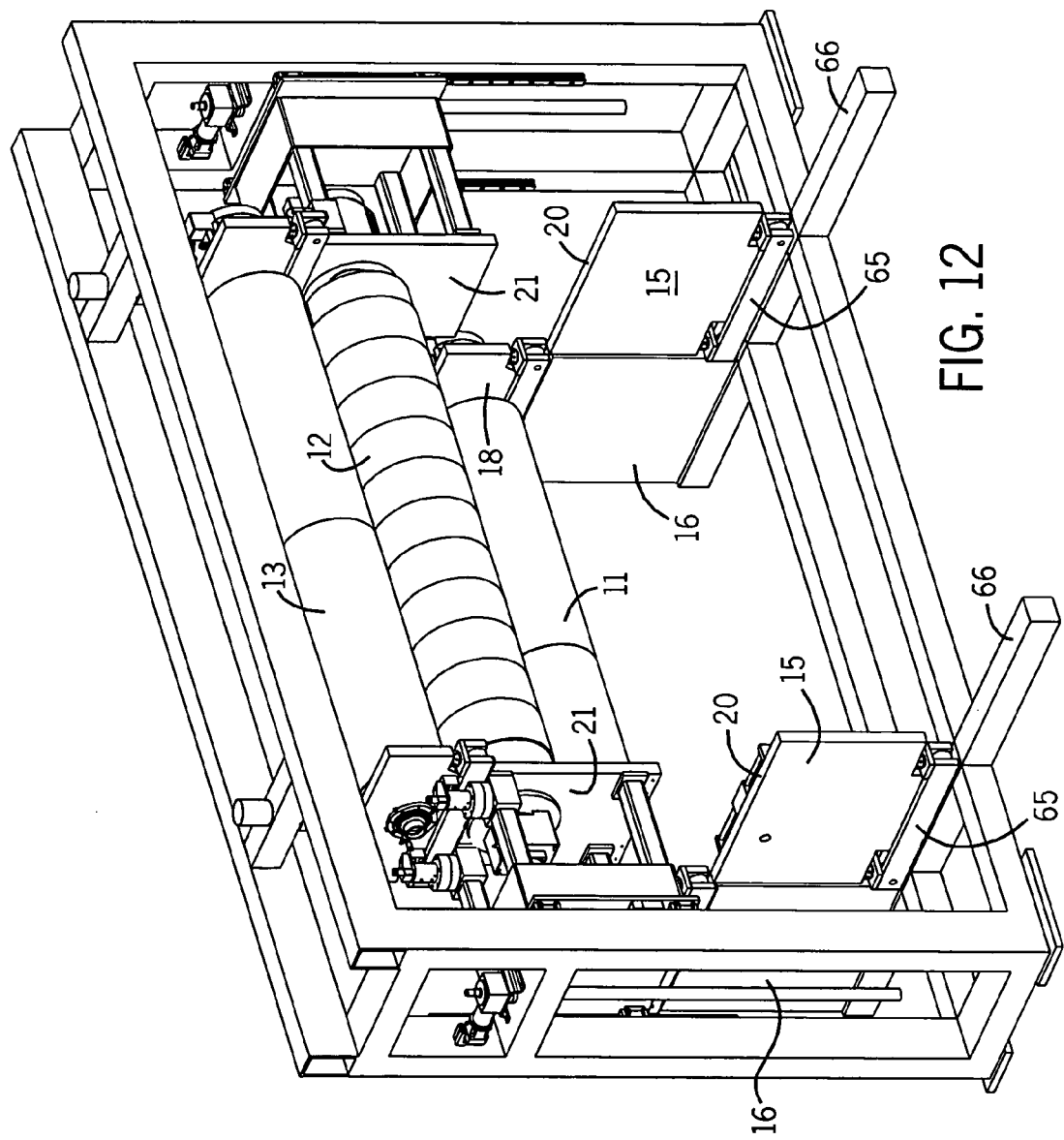

In FIGS. 5 and 11, after the second die cylinder 13 has been clamped to the anvil cylinder 12 by actuating the locking devices 24, the lead screw motor/reducers 26 are reversed to raise the anvil cylinder 12 vertically out of the opening 17 in the supporting base 14, carrying with it the second die cylinder 13 until the two cylinders reach their upper limit of movement in preparation for operation on the new order of sheets. Continuing with the sequence and as shown in FIGS. 6 and 12 the upstream base portions 15 are moved downstream to a position directly adjacent the downstream base portions 16 and vertically below the anvil cylinder 12. The first die cylinder 11 is then moved horizontally over the die cylinder tracks 19 and 20 from the position of FIGS. 6 and 12 and under the anvil cylinder 12 where the rolling carriages 67 of the die cylinder 11 rest on the upstream base portions 15. The lead screw motor/reducers 26 are then actuated to lower the anvil cylinder 12 on top of the die cylinder 11, compressing springs 75 in the carriages 67 of the die cylinder 11. The end supports 21 of the anvil cylinder 12 are then permitted to rest on the upper support surface 22 of the die cylinder 11 and the entire assembly is vertically clamped by actuating the clamp devices 68. Finally, the anvil cylinder eccentric bearing housing is rotated to bring the anvil cylinder 12 into operative contact with the die cylinder 13 to operate on the new order of paperboard sheets or the like. The operating position of the rotary die cutter 10 is identical to the initial operating position of FIGS. 1 and 7, except that the positions of the die cylinders 11 and 13 have been reversed. Die cylinder 11 in the FIG. 7 position is now in the setup position where the operator A may remove the cutting dies for the previously completed order and replace them with cutting dies for the next order and/or provide needed maintenance, all while the new order is being processed overhead between die cylinder 13 and anvil cylinder 12. The positioning of the movable upstream base portions 15 directly below the vertical arrangement of cylinders 11, 12 and 13 provides optimum bearing support and also enhances accessibility by the operator.

Figure 13:
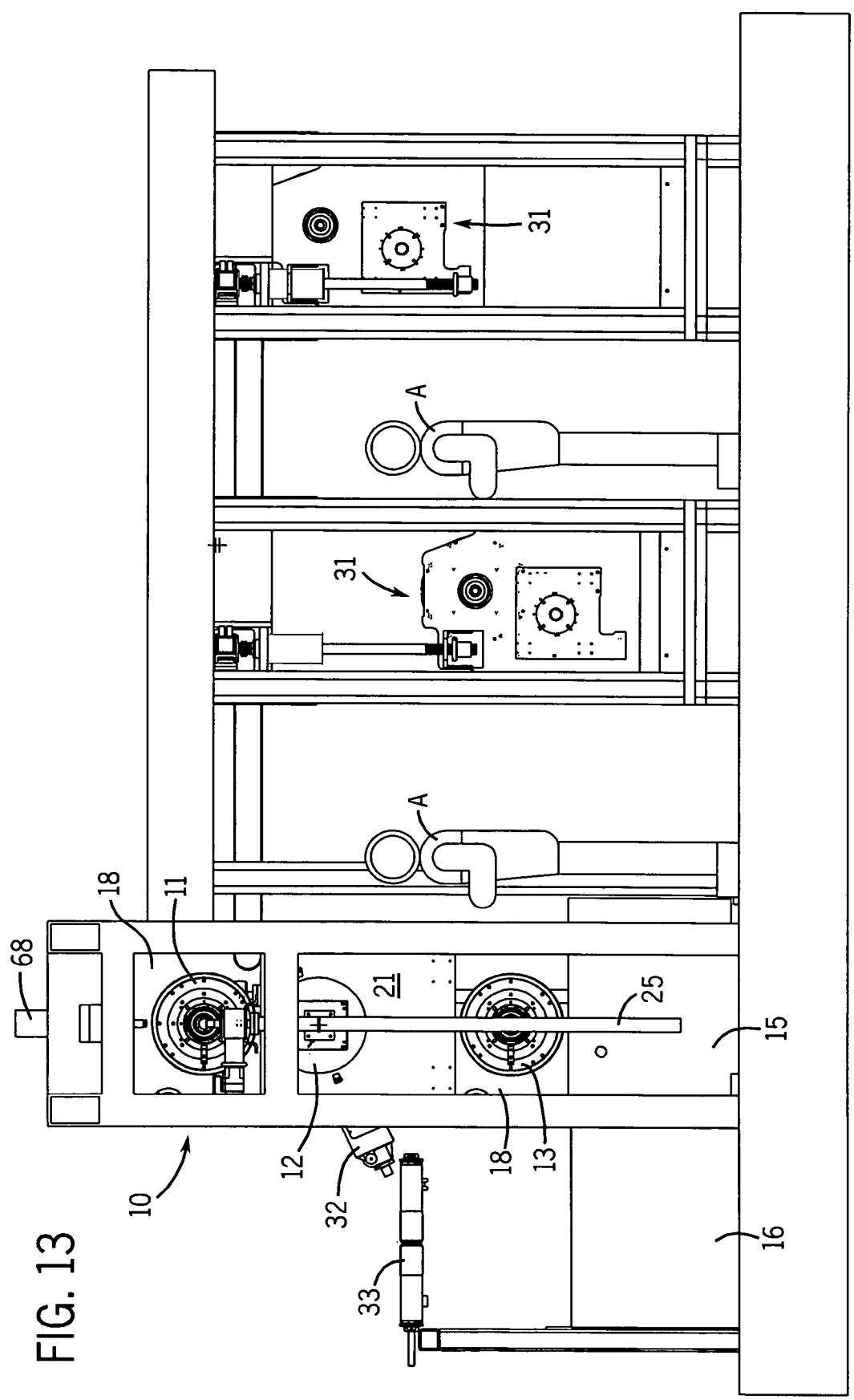
FIG. 13 is a side elevation view of the rotary die cutter shown in FIG. 7 and additionally showing its association with upstream print stations.

Referring to FIG. 13, the rotary die cutter 10 is shown with the end supports 18 of the lower die cylinder 13 resting directly on the base portions 15, the end supports 21 of the anvil cylinder 12 resting directly on the end supports 18 of the lower die cylinder 13, and the end supports 18 of the upper die cylinder 11 resting directly on the end supports 21 of the anvil cylinder 12. Vertical loads, particularly high shock loads, occurring for example by an errant object being jammed into the nip between the upper die cylinder 11 and the anvil cylinder 12, are transmitted directly vertically downwardly through the supporting base 14 and to the foundation. There is no structural connection between the rotary die cutter 10 and upstream print stations 31 to permit shock loads to be transmitted to the print stations. The die cutter 10 also includes an anvil cylinder grinder 32 which must be periodically operated to grind down uneven portions and reface the anvil cylinder 12 which typically comprises a hard rubber or plastic coating. With only vertical movement of the anvil cylinder and accompanying die cylinder, a simple horizontal translation device is all that is required to move the anvil grinder 32 in a horizontal downstream direction when die cylinder change is being effected. A scrap conveyor 33 is positioned just above the lower die cylinder 13 and provides ample space for the horizontal movement of the die cylinder 11 from the FIG. 3 to the FIG. 4 position and, therefore, the scrap conveyor 33 does not have to be moved at any time during die cylinder change or normal operation of the die cutter 10. Also, because each cylinder 11, 12 and 13 is independently driven by its own direct drive motor 74, linear translation of the cylinders and sequential separation of the die cylinders from the anvil cylinder is uncomplicated and simple. Furthermore, if an order of paperboard sheets requires only printing at one or more print stations 31 and die cutting is not necessary, the cylinders may be moved to either the FIG. 3 or the FIG. 4 position and the printed board may be processed over the top of the die cutter 10 without interference. In addition, with both die cylinders 11 and 13 in this lower position, either or both may be operated on to change the dies for subsequent orders.

Figure 15:
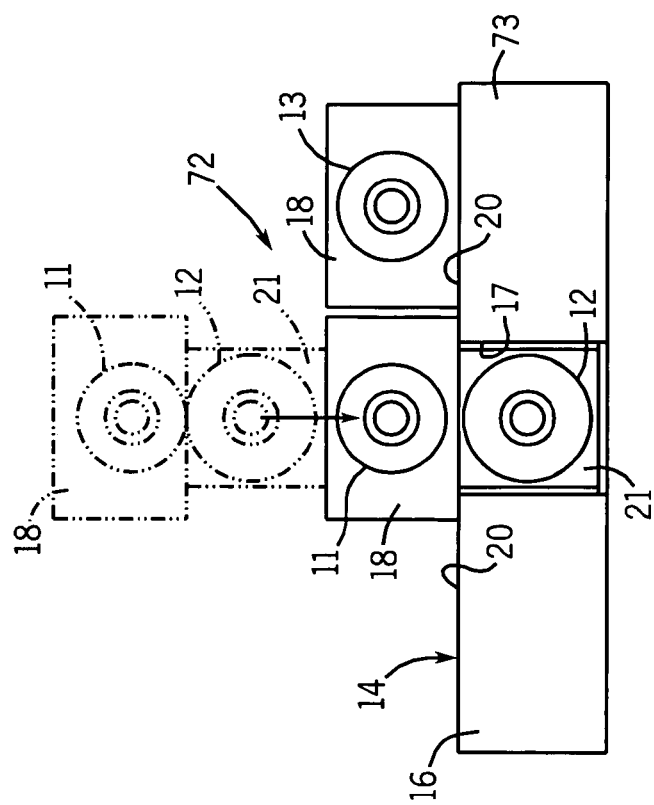
FIG. 15 is a schematic end view of the FIG. 14 embodiment showing horizontal translation of the inoperative die cylinder and a corresponding vertical translation of the operative die cylinder and anvil cylinder to the die cylinder exchange position.
Figure 14:
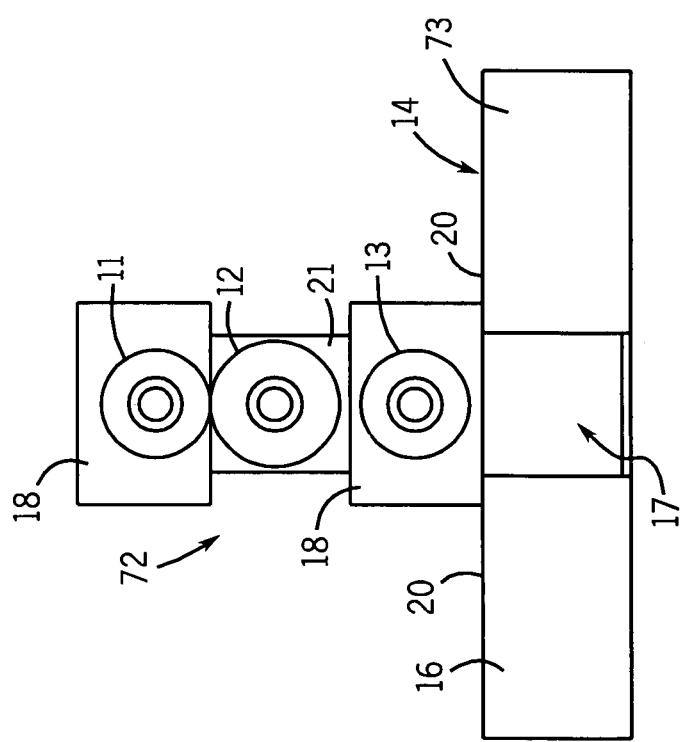
FIG. 14 is a schematic end view showing an alternate embodiment of the support arrangement for the cylinders in the operative position.

FIGS. 14 and 15 are schematic end views of an alternate embodiment of a rotary die cutter 72 of the present invention. This embodiment utilizes the same anvil cylinder and die cylinders arranged in the same manner as in the previously described preferred embodiment and, in addition, translates these cylinders vertically and horizontally to exchange the die cylinders in virtually the same manner as the preferred embodiment. The only significant difference in this alternate embodiment is the fixed positioning of the upstream base portions 73. Otherwise, the remaining elements of this alternate embodiment are the same and are so numbered.

Referring first of FIG. 14, and comparing the same with FIG. 1 of the preferred embodiment, the fixed position upstream base portions 73 define with the downstream base portions 16 an opening 17 which remains fixed during operation and during die cylinder exchange because the upstream base portions 73 remain fixed. The opening 17 is somewhat shorter in the machine direction (or alternately the end supports 18 of the first and second die cylinders 11 and 13 are longer in the machine direction) such that in the operative position, the die cylinder end supports 18 span the opening 17 and are supported on the upper edges 20 of both the upstream base portions 15 and the downstream base portions 16.

FIG. 15 is a composite of the corresponding movements of the preferred embodiment shown in FIGS. 2 and 3. In the first step of the FIG. 15 die cylinder exchange (and corresponding to FIG. 2), the lower die cylinder 13 is carried laterally from its FIG. 14 position over the top of the upstream base portions 73 on the die cylinder tracks 20. The fixed position upstream base portions 73, of course, remain stationary. The next translational movement (corresponding to FIG. 3) lowers the anvil cylinder 12 and upper die cylinder 11 vertically downward with the anvil cylinder entering the opening 17 and the upper die cylinder end supports 18 coming to rest on the upper edges of the base portions 16 and 73. Translational movement of the die cylinders and anvil cylinder continue in a manner identical to that shown in FIGS. 4 and 5, however, the FIG. 6 step is eliminated because the upstream base portions 73 are not moved.

Figure 16:
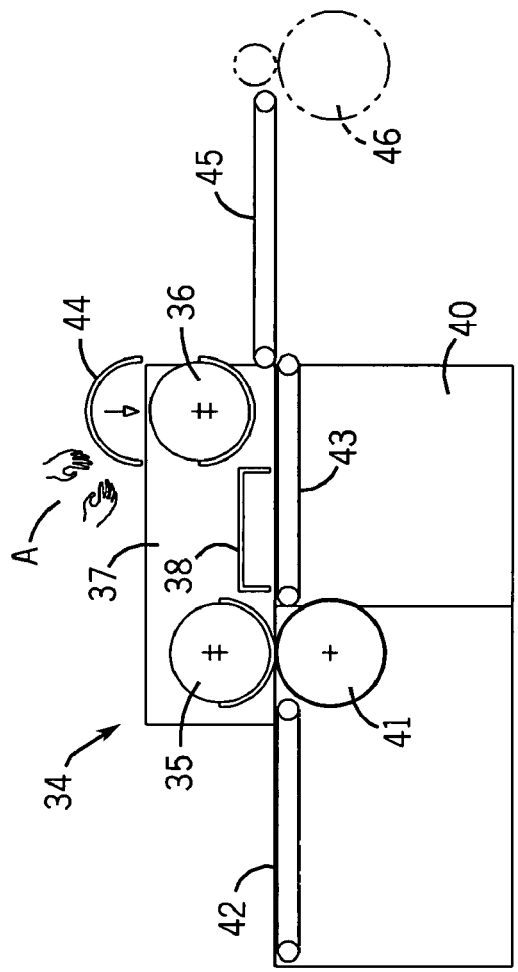
FIGS. 16 and 17 are schematic side elevation views of an alternate embodiment of the invention.
Figure 17:
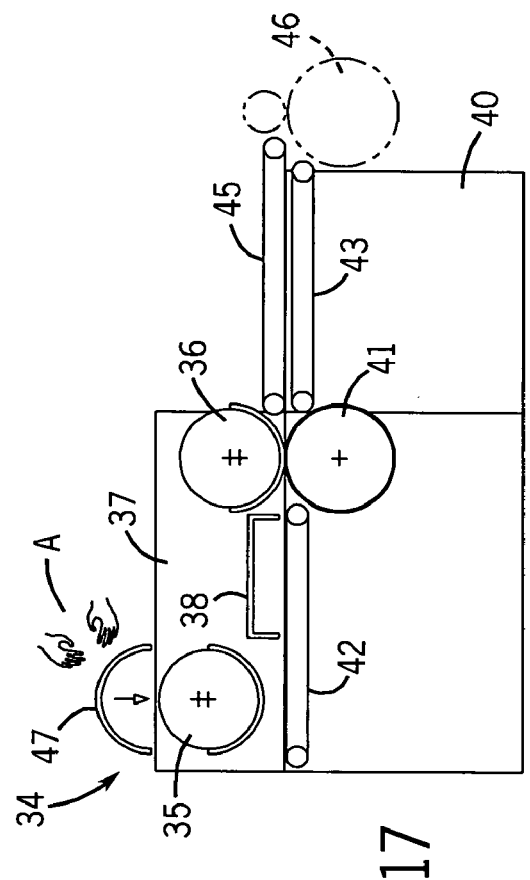

In FIG. 16, there is shown an alternate embodiment of a rotary die cutter 34 having a vertical support and rectilinear translation arrangement for interchanging die cylinders. In this embodiment, a downstream die cylinder 35 and an upstream die cylinder 36 are mounted on a fixed position frame 37 with an operator's platform 38 positioned between the cylinders. A horizontally translatable lower frame 40 is positioned for reciprocal motion in the machine direction beneath the fixed position frame 37. An anvil cylinder 41 is rotatably mounted on the center of the lower frame 40 move therewith between operating positions beneath each of the die cylinders 35 and 36. Also mounted on the horizontal lower frame 40 are a downstream outfeed conveyor 42 and an upstream infeed conveyor 43. Each of the die cylinders 35 and 36 is rotatably journaled in an eccentric bearing housing (not shown), such as that described with respect to the preferred embodiment above. Thus, each die cylinder 35 and 36 can be moved vertically a small amount from an upper inoperative setup position to a lower operating position in engagement with the anvil cylinder 41. In the FIG. 16 position, the downstream die cylinder 35 is shown in operative position with the anvil cylinder 41. The infeed conveyor 43 directs corrugated board or other sheet materials into the die cutting nip and the outfeed conveyor 42 carries the die cut board away. While the FIG. 16 order is being run, the operator A can change the cutting die 44 on the upstream die cylinder 36 for a new order. When the running order is completed, the downstream die cylinder 35 is moved upwardly a small distance by operation of its eccentric bearing housing, the lower frame 40 is moved horizontally in the upstream direction, as shown in FIG. 17, to bring the anvil cylinder 41 to a position directly below the upstream die cylinder 36, and the upstream die cylinder 36 is moved vertically downwardly on its eccentric bearing adjustment into operative position with the anvil cylinder 42. The infeed conveyor 43 drops vertically out of operating position and slides under a primary infeed conveyor 45 which may deliver board directly from an upstream print station 46. While the new order is running, the operator A on the platform 38 may remove the old order cutting die and replace it with a cutting die 47 for the subsequent order.

The embodiment of FIGS. 16 and 17 utilizes a very simple rectilinear translation of the various cylinders and, therefore, is of a very simple construction. It has the disadvantage, however, of requiring the operator to be positioned overhead and above the operating die cutter 34.

Figure 18:
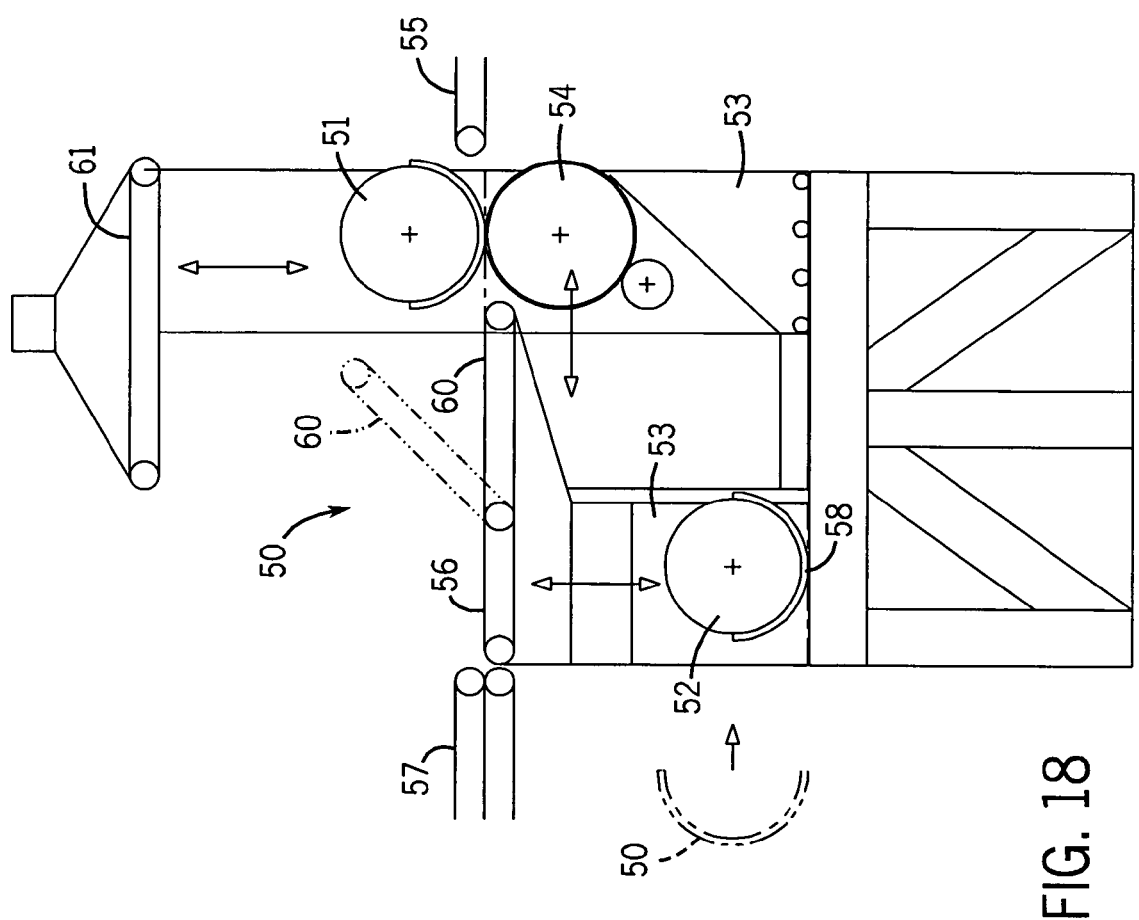
FIGS. 18 and 19 are schematic side elevation views of a further embodiment of the present invention.
Figure 19:
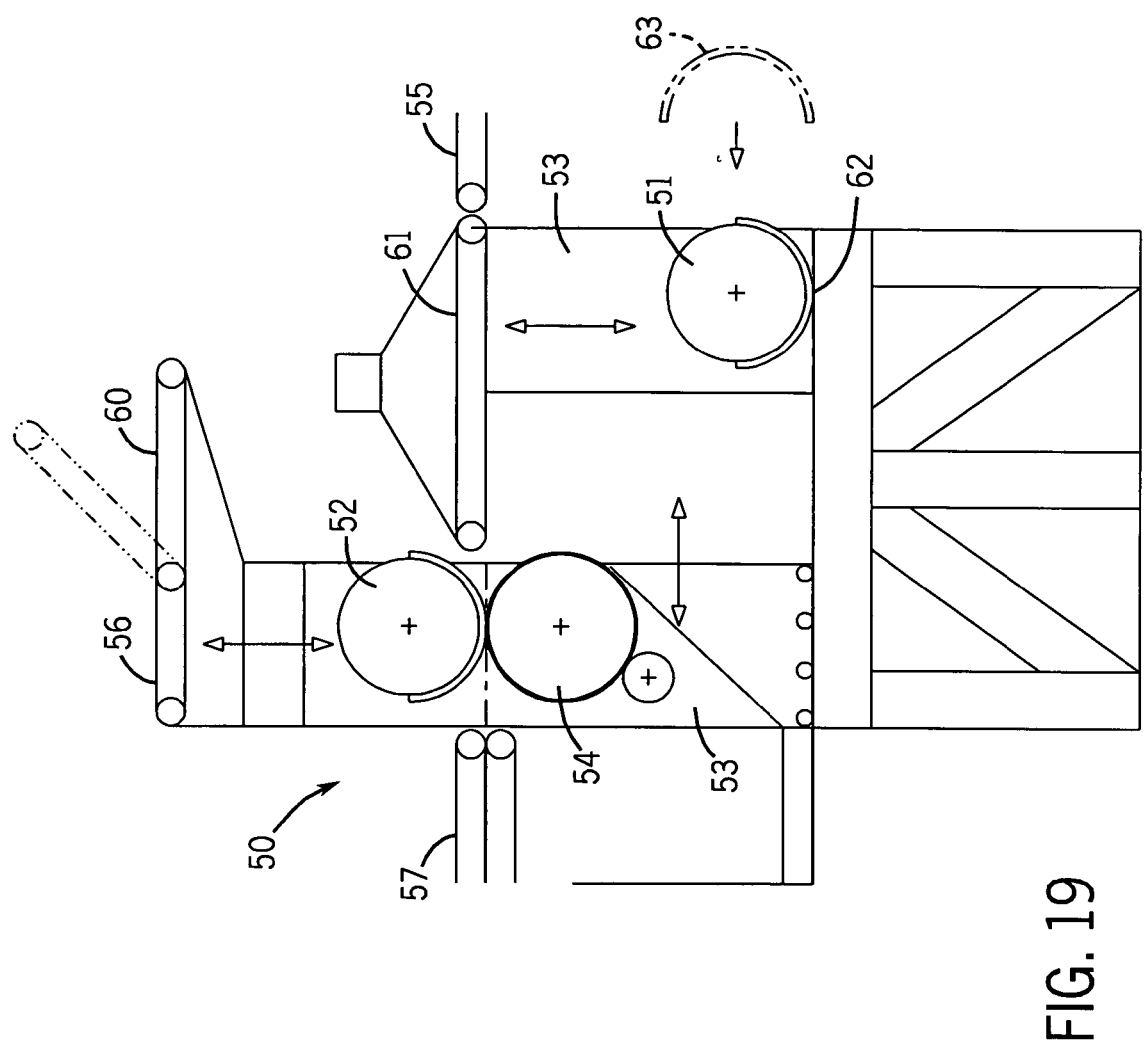

Another embodiment of a rotary die cutter 50, utilizing a vertical support and rectilinear translation arrangement for the die and anvil cylinders, is shown in FIGS. 18 and 19. The rotary die cutter 50 of this embodiment also utilizes a rather simple and straightforward rectilinear translation mechanism, but has a somewhat more complex infeed/outfeed conveyor exchange, as will be described. An upstream die cylinder 51 and a downstream die cylinder 52 are mounted on a supporting frame 53 for independent vertical movement from a lower setup position below the anvil roll 54 to an upper operating position above the anvil roll. The anvil roll 54 is mounted for reciprocal horizontal movement on the supporting frame 53. In FIG. 18, the upstream die cylinder 51 is shown in its upper operative position with the anvil roll 54 which has been moved horizontally to an operating position directly beneath the upstream die cylinder 51. Board is fed to the die cutter by a conventional upstream infeed conveyor 55. Board exiting the die cutter is received on an auxiliary outfeed conveyor 56 from which it moves onto a conventional outfeed conveyor 57. While the order is running, the downstream die cylinder 52 is in its lower inoperative setup position where the operator may mount a cutting die 58 for a subsequent new order.

When the running order has been completed, an upstream section 60 of the auxiliary outfeed conveyor 56 is pivoted upwardly to clear the operating nip, and the auxiliary outfeed conveyor 56 and downstream die cylinder 52 are moved vertically upwardly together to position the downstream die cylinder 52 above the board line (defined by the conveyors) and with the auxiliary outfeed conveyor 56 in a stand-by position. The anvil roll 54 is then translated horizontally in the downstream direction to an operating position beneath the downstream die cylinder 52, as shown in FIG. 19. An auxiliary infeed conveyor 61, which had been held in a stand-by position above the upstream die cylinder 51, is moved vertically downwardly therewith to a position in an infeed gap between the downstream end of the infeed conveyor 55 and the die cutting nip for the new order formed by the anvil roll 54 and the downstream die cylinder 52. The upstream die cylinder 51 by virtue of its vertical downward movement with the auxiliary infeed conveyor 61, is in a stand-by position where the operator may remove the completed order cutting die 62 and install a subsequent order cutting die 63. At subsequent order change, the process is reversed. It should also be noted that each of the die cylinders 51 and 52 is journaled in an eccentric bearing housing, in a manner similar to all of the previously described die cylinders, such that it may be moved on the eccentric bearing mounting vertically downwardly from an uppermost position, permitting the anvil roll 54 to be moved horizontally under it into operating engagement with the anvil roll.

As indicated above, the embodiment of FIGS. 18 and 19, though utilizing direct linear translation for effecting cylinder movement for order change, requires fairly complex auxiliary infeed and outfeed conveyors 61 and 56, respectively. In addition, the operator, though able to access each of the die cylinders 51 and 52 from a ground level position below the board line, must move from one side of the supporting frame 53 to the other.

We claim:

1. A vertical support and rectilinear translation arrangement for selectively repositioning one of a pair of die cylinders between an operative position and a stand-by position in a rotary die cutter having a rotary anvil cylinder and a pair of rotary die cylinders alternately operable with said anvil cylinder to define an operating nip for sheet materials being fed in a machine direction perpendicular to the rotational axes of the cylinders and along a board line within the nip, said arrangement comprising: a supporting base maintained within the lateral extent of the nip; said anvil cylinder or one of said pair of die cylinders supported at axial opposite cylinder ends for horizontal linear movement in the machine direction on said supporting base relative respectively to said pair of die cylinders or said anvil cylinder and the other of said die cylinders to achieve said selective repositioning; and, said respective pair of die cylinders or said anvil cylinder and the other of said die cylinders supported at axial opposite cylinder ends for vertical movement between an operative position and a stand-by position, wherein, in said operative position, said anvil cylinder and at least one die cylinder are vertically aligned and supported on said supporting base and wherein all movement of said die cylinders for said selective repositioning is confined to said lateral extent of the nip.

2. The apparatus as set forth in claim 1 wherein each die cylinder is supported for independent horizontal linear movement in the machine direction on the supporting base in its stand-by position;
said anvil cylinder is supported for vertical linear movement together with the operative die cylinder between an upper operating position and a lower die cylinder exchange position; and,
both of said die cylinders are supported for unidirectional horizontal linear movement on the supporting base in the die cylinder exchange position.

3. The apparatus as set forth in claim 2 wherein said supporting base includes a pair of laterally spaced upstream base portions and a pair of laterally spaced downstream base portions, one of said pairs of base portions movable between a closed position adjacent the other pair of base portions in the operative position and an open position spaced from said other pair of base portions to define an opening therebetween in the cylinder exchange position, said apparatus further comprising:
anvil cylinder end supports rotatably supporting the anvil cylinder at opposite axial ends on a vertical translation mechanism;
said anvil cylinder end supports sized to move into said opening in the base in response to downward movement on said translation mechanism to carry said operative die cylinder therewith to the lower die cylinder exchange position; and,
die cylinder end supports rotatably supporting each die cylinder at opposite axial ends on one of said base portion pairs in the stand-by and exchange positions and on said anvil cylinder end supports in the operative and exchange positions.

4. The apparatus as set forth in claim 3 wherein, in the operative position, the vertical support arrangement comprises, in serial vertical order, the movable base portions, one die cylinder in the stand-by position, the anvil cylinder, and another die cylinder in the operative position.

5. The apparatus as set forth in claim 3 wherein said base portions comprise:
a pair of fixed base portions having upper horizontal edges defining first die cylinder tracks;
a pair of translatable base portions having upper horizontal edges defining second die cylinder tracks and lower horizontal edges defining base portion carriages; and,
a pair of base tracks supporting the base portion carriages for moving said translatable base portions between the closed and open positions.

6. The apparatus as set forth in claim 5 wherein the end supports for each die cylinder include:
lower horizontal edges defining die cylinder carriages for moving the die cylinder on said first and second die cylinder tracks; and
upper horizontal edges for supporting the anvil cylinder end supports in the operative position.

7. The apparatus as set forth in claim 2 wherein said supporting base includes laterally spaced upstream base portions and laterally spaced downstream base portions defining therebetween an opening in the supporting base, said apparatus further comprising:
die cylinder end supports rotatably supporting each die cylinder at opposite axial ends on said base portions;
said die cylinder end supports sized and positioned to span the opening in the base in the stand-by position;
anvil cylinder end supports rotatably supporting the anvil cylinder at opposite axial ends on a vertical translation mechanism;
said anvil cylinder end supports sized to move into said opening in the base in response to downward movement on said translation mechanism to carry said operative die cylinder therewith to the lower die cylinder exchange position.

8. The apparatus as set forth in claim 7 wherein, in the operative position, the vertical support arrangement comprises, in serial vertical order, the upstream and downstream base positions, one die cylinder in the stand-by position, the anvil cylinder, and another die cylinder in the operative position.

9. The apparatus as set forth in claim 1 wherein said anvil cylinder is mounted for horizontal linear movement in the machine direction on said supporting base.

10. The apparatus as set forth in claim 9 wherein each of said die cylinders is alternately moveable vertically between the operative and stand-by positions in response to horizontal reciprocal movement of said anvil cylinder.

11. The apparatus as set forth in claim 10 wherein the anvil cylinder and the die cylinder in operative position are vertically aligned.

12. The apparatus as set forth in claim 11 comprising:

an outfeed conveyor and an infeed conveyor mounted on the supporting base downstream and upstream respectively of said anvil cylinder;

said infeed conveyor adapted to move horizontally with said anvil cylinder between an active downstream sheet infeed position and an inactive upstream position.

13. The apparatus as set forth in claim 12 wherein said outfeed conveyor is adapted to move horizontally with said anvil cylinder to provide an active sheet outfeed position in both the downstream and upstream positions of said anvil cylinder.

14. The apparatus as set forth in claim 11 wherein the die cylinders are horizontally spaced from each other to provide an upstream die cylinder and a downstream die cylinder and each die cylinder is mounted for reciprocal vertical movement between a stand-by position below the anvil cylinder and an operative position above the anvil cylinder.

15. The apparatus as set forth in claim 14 including an infeed conveyor mounted above said upstream die cylinder for vertical movement therewith between an active position with the upstream die cylinder in the stand-by position and an inactive position with the upstream die cylinder in the operative position.

16. The apparatus as set forth in claim 14 including an outfeed conveyor mounted above said downstream die cylinder for vertical movement therewith between an active position with the downstream die cylinder in the stand-by position and an inactive position with said downstream die cylinder in the operative position.

* * * * *